US008375425B2

(12) United States Patent
Keohane et al.

(10) Patent No.: US 8,375,425 B2
(45) Date of Patent: Feb. 12, 2013

(54) PASSWORD EXPIRATION BASED ON VULNERABILITY DETECTION

(75) Inventors: Susann Marie Keohane, Austin, TX (US); Gerald Francis McBrearty, Austin, TX (US); Patrick Shawn Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 11/939,614

(22) Filed: Nov. 14, 2007

(65) Prior Publication Data

US 2009/0126018 A1 May 14, 2009

(51) Int. Cl.
*H04L 29/06* (2006.01)
*G06F 21/00* (2006.01)
*H04L 9/32* (2006.01)

(52) U.S. Cl. .............................. 726/6; 713/183; 713/181
(58) Field of Classification Search .................... 726/18, 726/6, 5; 713/182, 183, 168, 181; 380/277, 380/286, 44
See application file for complete search history.

(56) References Cited

U.S. PATENT DOCUMENTS

| | | | |
|---|---|---|---|
| 5,719,941 A * | 2/1998 | Swift et al. ................... 713/155 |
| 5,721,779 A * | 2/1998 | Funk ............................ 713/155 |
| 6,064,736 A * | 5/2000 | Davis et al. .................... 713/155 |
| 6,996,718 B1 * | 2/2006 | Henry et al. ................... 713/182 |
| 7,965,843 B1 * | 6/2011 | Maino et al. ................... 380/256 |
| 7,975,292 B2 * | 7/2011 | Corella ............................. 726/6 |
| 8,046,823 B1 * | 10/2011 | Begen et al. ....................... 726/3 |
| 2005/0027713 A1 * | 2/2005 | Cameron et al. .............. 707/100 |
| 2005/0216955 A1 | 9/2005 | Wilkins et al. |
| 2005/0262563 A1 | 11/2005 | Mahone et al. |
| 2007/0006305 A1 | 1/2007 | Florencio et al. |
| 2007/0192601 A1 * | 8/2007 | Spain et al. ..................... 713/168 |
| 2008/0031447 A1 * | 2/2008 | Geshwind et al. ............... 380/46 |
| 2009/0320107 A1 * | 12/2009 | Corella ............................. 726/6 |

OTHER PUBLICATIONS

Luo et al. "A Common Password Method for Protection of Multiple Accounts", 14th IEEE International Symposium on Personal, Indoor and Mobile Radio Communication Proceedings. 2003. 6 pgs.*

* cited by examiner

*Primary Examiner* — Zachary A Davis
(74) *Attorney, Agent, or Firm* — Yee & Associates, P.C.; Libby Z. Toub

(57) ABSTRACT

A computer implemented method, data processing system and computer program product are disclosed for password expiration based on vulnerability detection. A request for a password is received during re-activation of a first account that belongs to a particular user. A test password is compared to a previously created password that belongs to the particular user to determine if a match occurred. Responsive to determining that there is a match, a second account that belongs to the particular user with respect to the match is expired.

13 Claims, 3 Drawing Sheets

PASSWORD EXPIRATION BASED ON VULNERABILITY DETECTION

BACKGROUND

1. Field of the Invention

The present application relates generally to improved security in a data processing system and in particular to a computer implemented method, data processing system and computer program product for password expiration based on vulnerability detection.

2. Description of the Related Art

A common best practice of security and password administration is to cause user passwords to expire, forcing the user to change their password periodically. Not only do users cycle their password changes, they commonly change all of their passwords to be the same. For example, within a company users may be required to use a common tool or utility which specifically facilitates multiple password changes with a "change all passwords" feature.

The practice of changing multiple passwords to be the same exposes vulnerability, in that when one password is compromised, all of the user's passwords are compromised. Intruders leverage this vulnerability when they discover a password, for example, by a keyboard logger or network packet snooping. The intruders then reuse the discovered password on all of the user's accounts and other systems. This technique allows the attacker to break into the weakest of systems and quickly escalate their penetration into the most secure of systems.

SUMMARY OF THE INVENTION

Illustrative embodiments provide a computer implemented method, an apparatus and a computer program product for password expiration based on vulnerability detection. The computer implemented method comprises receiving a request for a password after re-activating a user account and forwarding the request to a password generator. The method further generates a password. A test password is compared to a previously created password of a user to determine if there is a match.Responsive to determining that there is a match, an account of the user with respect to the match is expired.

The apparatus comprising a receiver capable of receiving a request for a password after re-activating the user account. A sender capable of forwarding the request to a password generator included. A generator is capable of generating a password. A comparator is capable of comparing a test password to a previously created password of a user to determine if there is a match. An expiration component, responsive to determining that there is a match, is capable of expiring an account of the user with respect to the match.

The computer program product comprises computer executable program code tangibly embodied in a computer usable recordable medium. The computer executable program code comprises computer executable program code for receiving a request for a password after re-activating the user account and for forwarding the request to a password generator. Computer executable program code for generating a test password is include. Computer executable program code is included for comparing the test password to a previously created password of a user to determine if there is a match. Computer executable program code is included responsive to determining that there is a match entry for expiring an account of the user with respect to the match.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
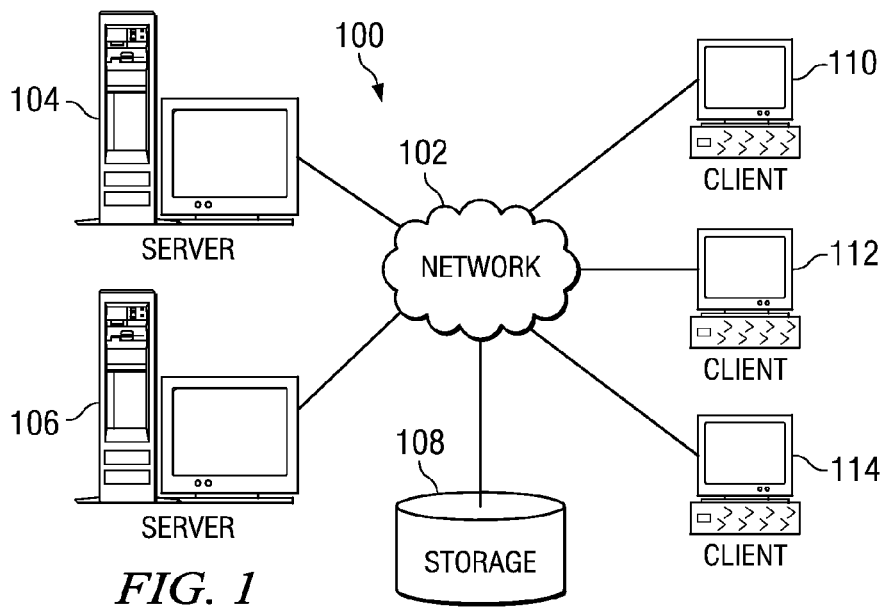
FIG. 1 is a pictorial representation of a network of data processing systems in which illustrative embodiments may be implemented.
Figure 2:
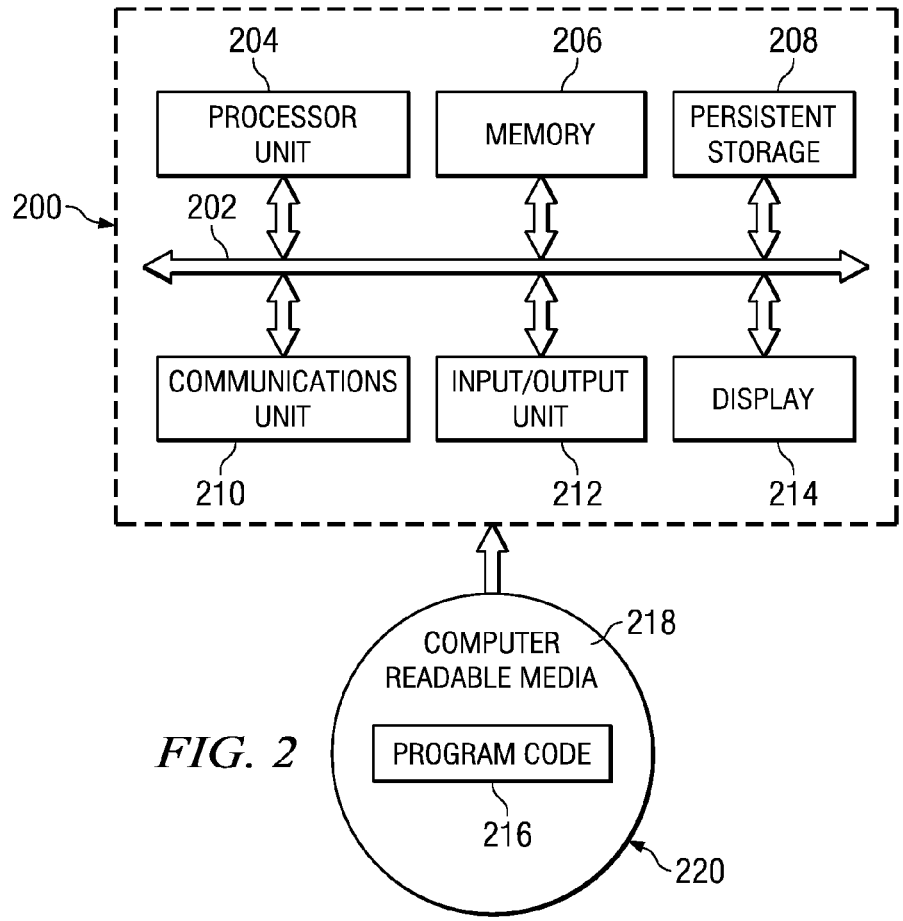
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto, or transferred to data processing system 200, for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to, or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

An illustrative embodiment provides a capability for receiving a request for a password after re-activating a user account and requesting a password generator to create a hashed password. The capability further comprises comparing the hashed password to a previously created password of a user in a central store, to determine if there is a match. Responsive to determining that there is a match, an account of the user with respect to the match is expired.

Figure 3:
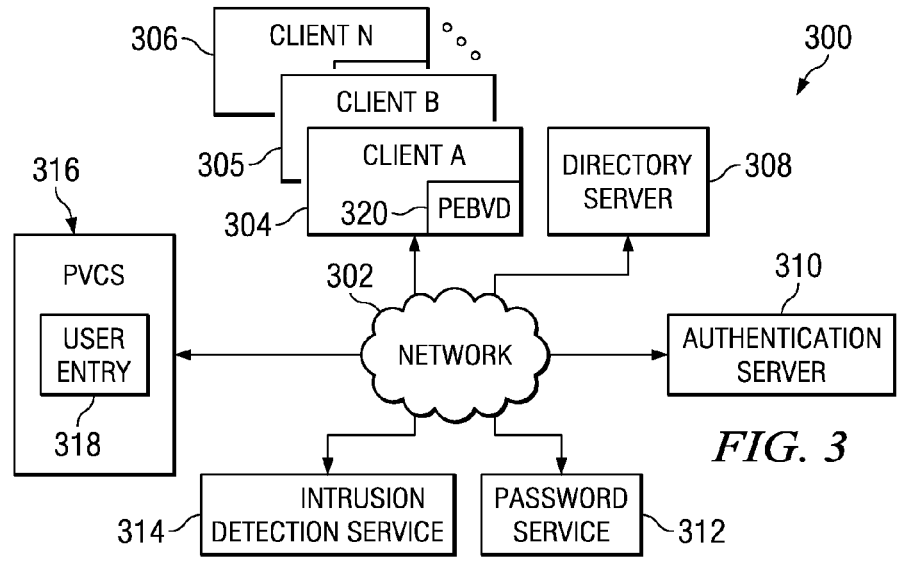
FIG. 3 is a block diagram of exemplary components of a data processing system in accordance with illustrative embodiments.

With reference to FIG. 3, a block diagram of exemplary components of a data processing system in accordance with illustrative embodiments is shown. Data processing system 300 comprises a plurality of servers and clients connected to a network. The use of separate machines is not a requirement or limitation, but is merely used to illustrate the type of function being provided in an efficient manner.

Network 302 may be a form of network that is known to conveniently connect the various clients and servers in the performance of useful data processing providing business results to an enterprise. A plurality of clients 304, 305 and 306 respectively, are connected to network 302 in the performance of their respective tasks often requiring application and data sharing. Applications that are typically shared include the creation of passwords, authentication, and directory services. Clients 304, 305 and 306 each have a component for password evaluation based on vulnerability detection (PEBVD) agent 320. Password evaluation based on vulnerability detection agent 320 cooperates with a password vulnerability central store(PVCS) 316 to remediate unauthorized intrusions of a protected system.

Directory server 308 performs data location services on request from clients 304, 305 and 306. Users of the clients request data that is located through directory server 308. Requests for data and user login are typically authenticated through an authentication service, such as authentication server 310. Authentication services typically validate a password supplied by a requester, such as a user, prior to allowing access to a resource. Additionally, clients, 304, 305, or 306 may independently validate the supplied password locally without the aid of authentication server 310.

Password service 312 provides capabilities to respond to user requests to generate passwords in compliance with the requirements of the data processing system rules. For example, the rules may force users to supply passwords that are a specific length and contain certain choices of characters or symbols, as well as require the changing of passwords within a specified time period. Failure to comply when creating a password results in disallowing the creation of the password, while failure to change an expired password results in access to the function, application, or machine being denied.

Intrusion detection service 314 typically provides a collection of services that review access to resources to determine if any access or pattern of access does not meet specified criteria of the enterprise. The services typically include a review of logged activity to monitor the creation of information by the many system services that generate access records.

For example, intrusion detection service 314 would review web server, directory server, mail server, and authentication server logs to analyze critical security information collected for information indicating violation of enterprise access policies.

Intrusion detection services are provided by vendors, as well as other providers. These services also may be obtained through the open source software community resources of a security project.

Password vulnerability central store 316 contains a plurality of entries for each user of the respective managed data processing system. In particular, a user entry 318 contains information regarding the user, such as, the user ID, the global salt for that user, and protected passwords of that user, as well as a location of use for each respective password.

The global salt is a random string of characters that is added to the raw string of characters supplied by a user in a password creation request. The salt may be applied as a prefix, suffix, or within the string of characters of the raw password. The salt may be in any password key derivation form required by the client's authentication service or required by a central authentication server. The random nature of the salt prevents two users supplying the same raw string of characters in a password request from obtaining the same password as a result from a service, such as password service 312.

Password evaluation based vulnerability detection (PE-BVD) agent 320 of a user, such as client 304, cooperates with password vulnerability central store 316 to obtain the global salt for the user, client 304, from user entry 318 when requesting setting or changing a password by password service 312 or changing the password local to the client. Password evaluation based vulnerability detection agent 320 may also act as a sender capable of forwarding a request to a password generation service.

Figure 4:
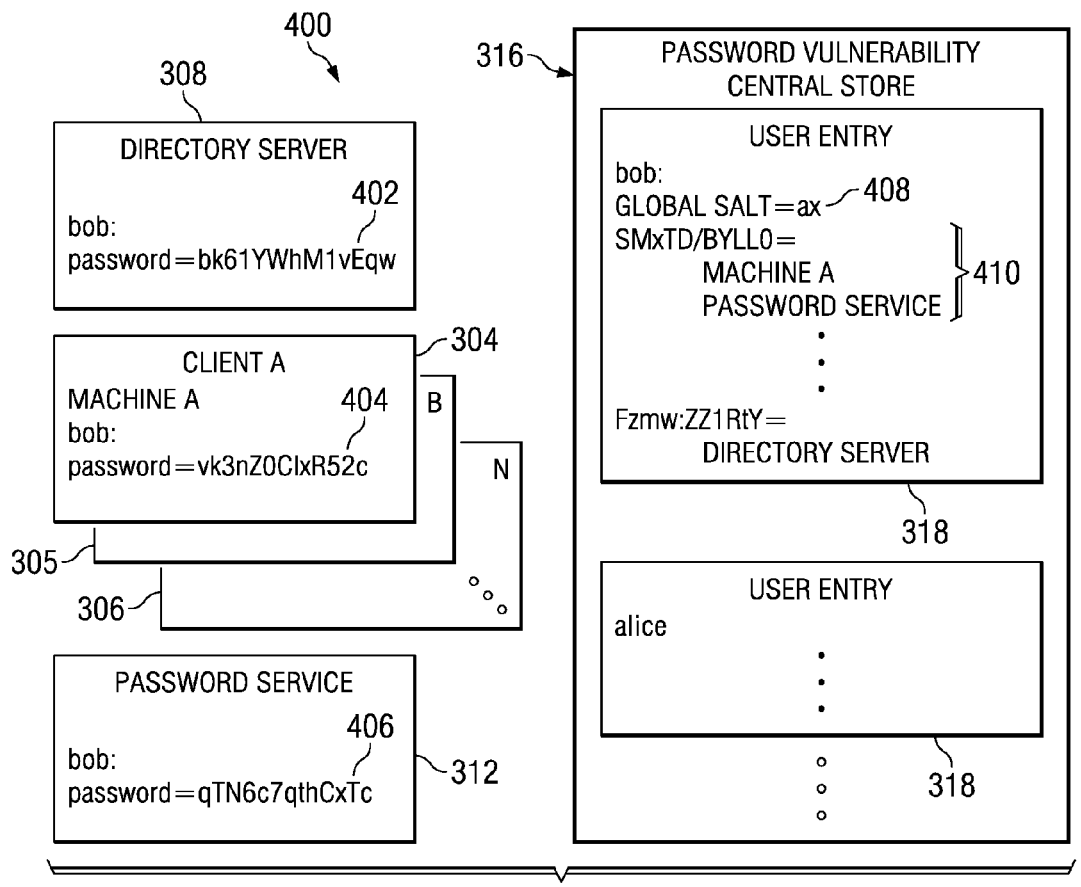
FIG. 4 is a block diagram of exemplary components with user entries in accordance with illustrative embodiments.

With reference to FIG. 4, a block diagram of exemplary components with user entries in accordance with illustrative embodiments is shown.

Password methodology may be typically illustrated through an illustration using a UNIX password. The password is a one way hash, meaning that given the result of the one way hash a user cannot determine the input to the hash. For example, a command to display the content of the security directory "/etc/security/passwd:" may return an entry for "shawnm:" having a "password=BjGMePmSViSpQ."

The input to the UNIX or crypt one way hash function is crypt (salt, raw password) resulting in the output of BjGMePmSViSpQ, for example. The salt is a randomly generated character or characters. In this example, the salt is "Bj" of the password output BjGMePmSViSpQ.

In the previous example the salt was placed as a prefix. In other cases the salt may be a suffix or occur in the midst of the character string. This means if two people choose the same password, "foobar", then they would end up with different results from crypt ( ) function because the salt is initially random. For example, if Bob and Alice both chose "foobar" as their password, the result may be that for alice "password=lga.ZUt0izHlg," while for bob "password=vK3nZoClxQ52c."

Components previously shown in FIG. 3 now contain simplified examples of user entries typically used to identify users in an example of data processing system 400. Password entries 402, 404 and 406 provide illustrative embodiments of user passwords as may be found on the respective resources. Each password has been generated using the prescribed input of the enterprise including use of the salt. For example, the password entry 404 for account bob on machine A and client A 304, contains "password=vK3nZOCIxR52c.

In password vulnerability central store 316, the user entry 308 for bob has a global salt 408 indicating a specific value for bob is "ax" that is used to generate and retain passwords after account reactivation. The password entry 410 stored in the entry for bob is shown as "SMxTD/BYLLO" and is a shared password for resources "Machine A" and "Password Service." The password may be generated by a generator on password vulnerability central store 316 or a separate facility and sent to password vulnerability central store 316 for storage.

In accordance with illustrative embodiments, when an account for bob is compromised, the entries related to bob in password vulnerability central store 316 are checked for all related entries indicating other potentially vulnerable resources. In this example, an intrusion related to an account on "Machine A" for bob would result in an action against an account of bob on "Password Service" because both resources use the same password.

Figure 5:
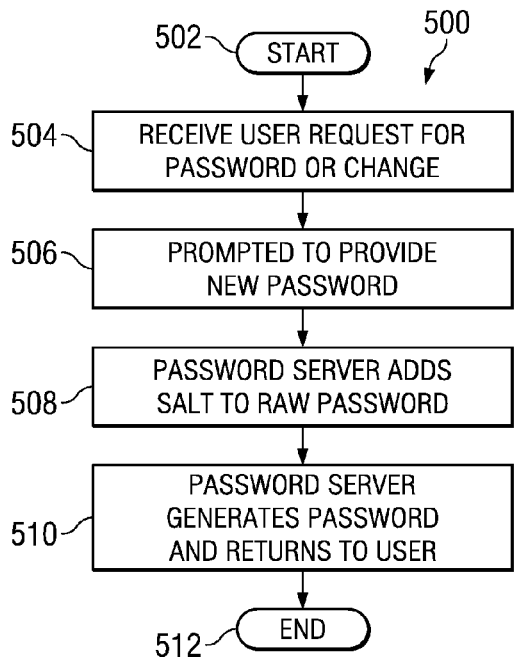
FIG. 5 is a flowchart of a process of password generation without password evaluation based on vulnerability detection.

With reference to FIG. 5, a flowchart of a process of password generation without password evaluation on based vulnerability detection is shown. Process 500, of password service 312 of FIG. 3, represents a typical password generation process as may be found on a UNIX™ system. Process 500 begins at start 502 then receives a user request for a new password or change to an existing password (step 504). The user is then prompted to provide the characters of the raw password in accordance with the requirements of the specific installation or enterprise (step 506). Having received a supplied character string from the user, the password generation service adds a salt (step 508). The password server then generates the final password and returns the just created password to the requesting user (step 510). Process 500 then ends (step 512).

Figure 6:
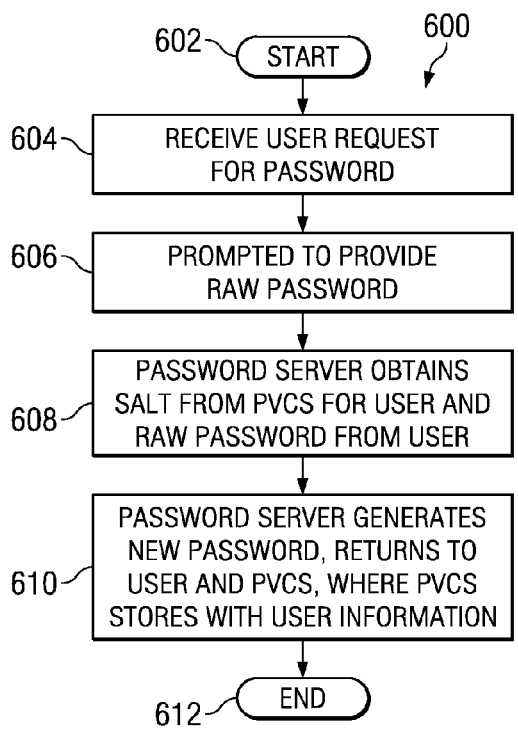
FIG. 6 is a flowchart of a process of password generation with password evaluation based on vulnerability detection in accordance with illustrative embodiments.

With reference to FIG. 6, a flowchart of a process of password generation with password evaluation based on vulnerability detection in accordance with illustrative embodiments is depicted. Process 600 begins at step 602 and receives a request from a user for a password to be set or changed (step 604). The user is prompted to provide a string of characters in accordance with the requirements of the enterprise (step 606).

The password expiration based on the vulnerability detection agent of the client requests the user specific salt from the password vulnerability central store component. The salt is provided to the password service in combination with the user provided string of characters (step 608). The password service then generates the requested password using the salt and the string of characters and returns the just created password to the user. In addition, the password service sends the password to the password vulnerability central store component where it is stored along with other specific information of the respective user (step 610). The process 600 ends thereafter (step 612).

Figure 7:
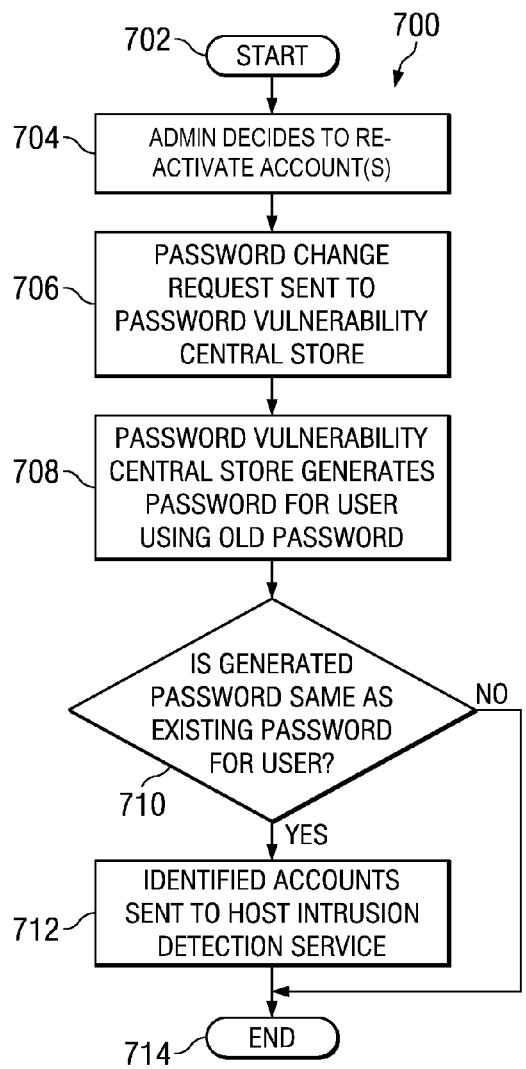
FIG. 7 is a flowchart of a process of intrusion detection and remediation in accordance with illustrative embodiments.

With reference to FIG. 7, a flowchart of a process of intrusion detection and remedation is depicted in accordance with an illustrative embodiment. Process 700, of password vulnerability central store 316 of FIG. 4, depicts remediation operations after an intrusion detection service has detected an intrusion. Process 700 starts (step 702) and moves to where an administrator having reviewed the situation for the affected user account has decided to re-activate the user account (step 704). As part of the re-activation, the user is required to request a new or changed password. The request is received by the receiver portion of the password evaluation based vulnerability detection agent and then forwarded by the sender portion to the password vulnerability central store (step 706). The request includes the old password string of characters.

The password vulnerability central store receives the request, retrieves the user specific salt and using a password generator capable of generating a password, generates the password using the old password characters creating a hashed password (step 708). The just created hashed password is then compared, using a comparator of the password vulnerability central store, to determine if there is a match with any other stored passwords allocated to the respective user (step 710).

If a password match entry is obtained, a "yes" is returned from step 710, otherwise a "no" is returned. If there was a "yes" result in step 710, process 700 would move to send notification of each match entry to the intrusion detection service for each match identified with the account password match (step 712) and ends (714). If a "no" is returned in step 710, process 700 bypasses step 712 moving directly to end (step 714).

The entry provided to the intrusion detection service would indicate the resource and location, with respect to the compromised account, for each match. Having received notification with respect to an account, intrusion detection services acting as an expiration component expires, locks or otherwise invalidates the specific accounts at the respective locations.

In an alternative embodiment, intrusion detection system 314 of FIG. 3 may identify a user having a password compromised and on which system. For example, intrusion detection system 314 discovered the password of Bob on Machine A had been compromised. The intrusion detection system 314 would contact the password vulnerability central store 316, with a query ,such as: "Bob's password on Machine A was compromised. What other systems did Bob use the same password on?" From a look up in intrusion detection system 314, information is retrieved from user entry 410 of FIG. 4, in which is identified the password service 312 as a place where Bob used the same password. The system administrator would then know that there is a probability that the account belonging to Bob for the Password Service is also compromised. The system administrator would then take safeguards to remediate the compromised account and password belonging to Bob on both machine A of client 304 and the password service 312.

Password expiration based on vulnerability detection works with all systems, no matter their different password restrictions, lengths, and non-alphanumeric restrictions. Regardless of the individual system's password requirements, password expiration based on vulnerability detection associates the user's different passwords in their encrypted form with the logon id. Therefore, when a single system is compromised, all systems in which the user has used the same password can quickly be identified. These identified systems are then notified to "expire" the user's account, before the intruder can reuse the password on other systems.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain store the program for use by or in connection with the instruction execution system, apparatus, or device.

The medium can be an electronic, magnetic, optical, electromagnetic, infrared, or semiconductor system (or apparatus or device). Examples of a computer-readable recordable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a transmission medium that is, for example, without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for password expiration based on vulnerability detection, the computer implemented method comprising:
receiving, by a store that stores user entries, a request from a particular user using a client computer for a new password during re-activation of a first user account that belongs to the particular user, wherein the request includes a raw password that was used by a hash function to create an existing password for the particular user, and further wherein the store is external to the client computer;
retrieving, from a particular one of the user entries that is associated with the particular user, a particular user-specific salt value, wherein the particular user-specific salt value and the raw password are stored in the store in the particular one of the user entries, and wherein the particular user-specific salt value is specific to the particular user;
generating, using a processor unit, a test password using the hash function, wherein the hash function receives the raw password and the particular user-specific salt value as inputs;
determining, for each one of a plurality of resources, whether a resource password stored in each one of the plurality of resources matches the test password, and wherein a list of the plurality of resources is stored in the particular one of the user entries; and
responsive to determining that the test password matches a particular resource password for a particular one of the plurality of resources, expiring a second account that belongs to the particular user at the particular one of the plurality of resources.

2. The computer implemented method of claim 1 wherein the plurality of resources use the raw password.

3. The computer implemented method of claim 1 wherein a password generator in the store generates the test password.

4. The computer implemented method of claim 1 further comprising:
providing a resource identifier and respective location associated with the user account at the particular one of the plurality of resources.

5. The computer implemented method of claim 1 wherein expiring the second account is performed by an intrusion detection service.

6. A data processing system for password expiration based on vulnerability detection, the data processing system comprising:
a client computer;
a store that stores user entries, wherein the store receives a request, from a particular user using the client computer for a new password during re-activation of a first user account that belongs to the particular user, wherein the request includes a raw password that was used by a hash function to create an existing password for the particular user, and further wherein the store is external to the client computer;
a processing unit that executes computer usable program code to:
retrieve, from a particular one of the user entries that is associated with the particular user, a particular user-specific salt value, wherein the particular user-specific salt value and the raw password are stored in the store in the particular one of the user entries, and wherein the particular user-specific salt value is specific to the particular user;
generate a test password using the hash function, wherein the hash function receives the raw password and the particular user-specific salt value as inputs;
determine, for each one of a plurality of resources, whether a resource password stored in each one of the plurality of resources matches the test password, and wherein a list of the plurality of resources is stored in the particular one of the user entries; and
responsive to determining that the test password matches a particular resource password for a particular one of the plurality of resources, expire a second account that belongs to the particular user at the particular one of the plurality of resources.

7. The data processing system of claim 6 wherein the plurality of resources use the raw password.

8. The data processing system of claim 6 further comprising a resource identifier and respective location associated with a user account at the particular one of the plurality of resources.

9. The data processing system of claim 6 further comprising a system that executes an intrusion detection service that expires the second account.

10. A computer program product for password expiration based on vulnerability detection, the computer program product comprising computer executable program code tangibly embodied in a non-transitory computer usable recordable medium, the computer executable program code comprising:
computer executable program code for receiving, by a store that stores user entries, a request from a particular user using a client computer for a new password during re-activation of a first user account that belongs to the particular user, wherein the request includes a raw password that was used by a hash function to create an existing password for the particular user, and further wherein the store is external to the client computer;
computer executable program code for retrieving, from a particular one of the user entries that is associated with the particular user, a particular user-specific salt value, wherein the particular user-specific salt value and the raw password are stored in the store in the particular one of the user entries, and wherein the particular user-specific salt value is specific to the particular user;
computer executable program code for generating a test password using the hash function, wherein the hash function receives the raw password and the particular user-specific salt value as inputs;
computer executable program code for determining, for each one of a plurality of resources, whether a resource password stored in each one of the plurality of resources matches the test password, and wherein a list of the plurality of resources is stored in the particular one of the user entries; and
computer executable program code responsive to determining that the test password matches a particular resource password for a particular one of the plurality of resources, for expiring a second account that belongs to the particular user at the particular one of the plurality of resources.

11. The computer program product of claim 10 wherein the plurality of resources use the raw password.

12. The computer program product of claim 10 further comprising computer executable program code for providing a resource identifier and respective location associated with the user account at the particular one of the plurality of resources.

13. The computer program product of claim 10 further comprising computer executable program code for expiring the second account using an intrusion detection service.

* * * * *